United States Patent

[11] 3,608,545

[72] Inventors Bernard Novack
Fort Lee;
Jesse L. Acker, Rockaway, both of N.J.
[21] Appl. No. 778,382
[22] Filed Nov. 25, 1968
[45] Patented Sept. 28, 1971
[73] Assignee Medical Engineering Research Corporation
Parsippany, N.J.

[54] HEART RATE MONITOR
17 Claims, 5 Drawing Figs.

[52] U.S. Cl. ................................................. 128/2.06
[51] Int. Cl. .................................................. A61b 5/02
[50] Field of Search ............................. 128/2.05 P,
2.05 S, 2.05 T, 2.06, 2.05 M

[56] References Cited
UNITED STATES PATENTS

| | | | |
|---|---|---|---|
| 2,536,527 | 1/1951 | Appel............................. | 128/2.05 P |
| 2,848,992 | 8/1958 | Pigeon........................... | 128/2.05 P |
| 3,228,391 | 1/1966 | Fitter et al. ..................... | 128/2.05 T |
| 3,352,300 | 11/1967 | Rose............................. | 128/2.06 |
| 3,438,367 | 4/1969 | Karsh et al..................... | 128/2.06 |

*Primary Examiner*—William E. Kamm
*Attorneys*—Albert C. Johnston, Robert E. Isner, Lewis H. Eslinger and Alvin Sinderbrand ABSTRACT: In a heart rate monitor, two electrical inputs derived from ECG. electrodes and from an arterial pulse pickup are received by separate channels to produce respective electrical outputs, such as, variable DC voltages, corresponding to the intervals between successive QRS and arterial pulses, and hence to the rates of such pulses, deviations of such electrical outputs beyond adjustably preset limits of allowable ranges therefor are detected, and an alarm is actuated, as through a digital logic circuit and preferably to operate in synchronism with the QRS pulses, only in response to patient conditions represented by predetermined combinations of detected deviations of the electrical outputs outside the allowable ranges therefor. Further, suitable time delays are provided to cause actuation of the alarm soon after the occurrence of certain combinations of deviations, such as, no pulse and no ECG. or fibrillation (high ECG. rate and no pulse) and to delay the actuation of the alarm in the case of other deviations, such as, the combination of high ECG. or QRS and high arterial pulse rates.

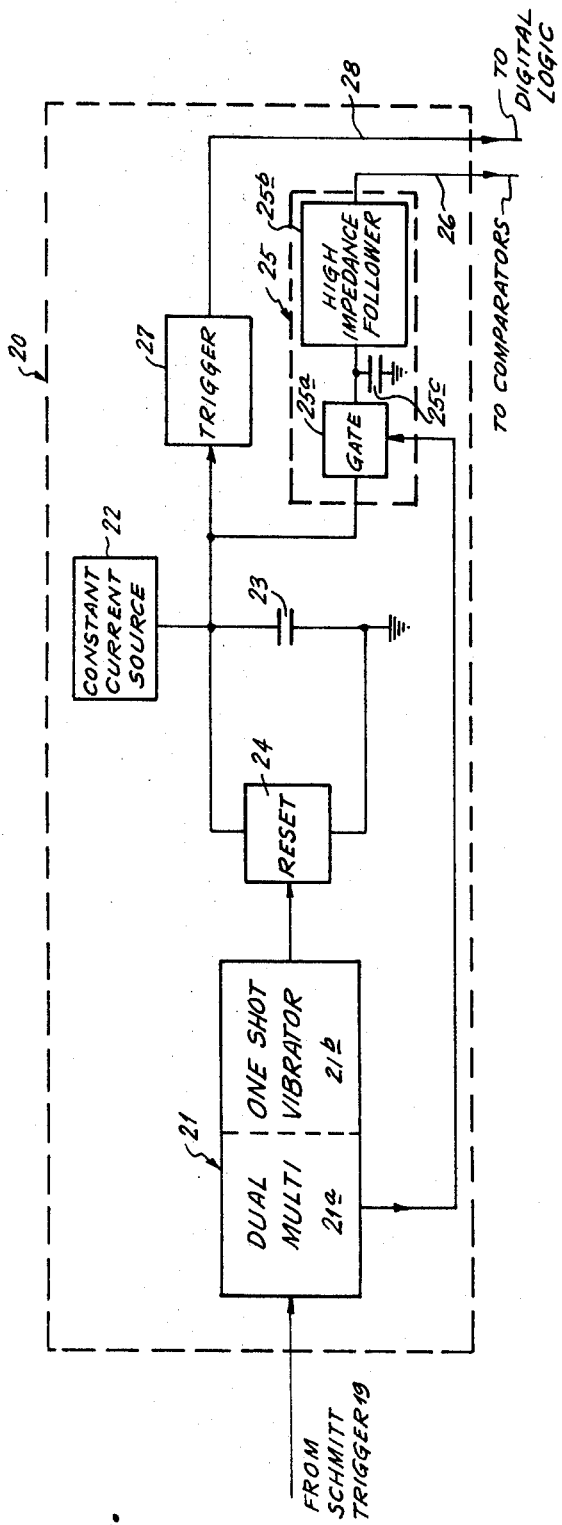
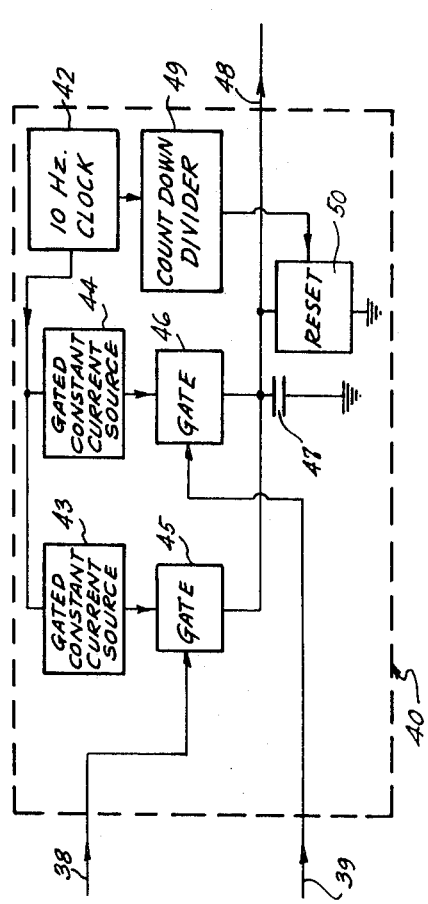
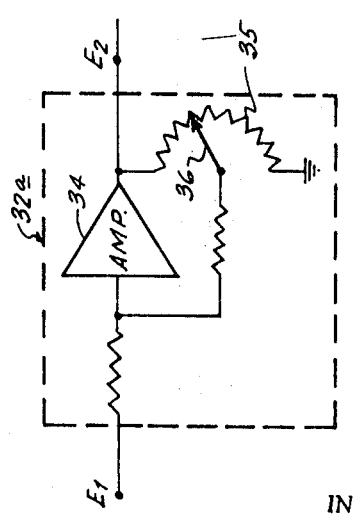
Fig. 2.
Fig. 4.
Fig. 3.
INVENTOR.
BERNARD NOVACK
BY JESSE L. ACKER
ATTORNEY.

HEART RATE MONITOR

This invention relates generally to apparatus for monitoring the heart rate of a patient and for alerting medical personnel to the onset of a heart attack or cardiac arrythmias in such patient.

Heart rate monitors heretofore provided have been intended primarily for use in operating rooms, intensive-care wards, recovery rooms and coronary-care units, where dense assemblies of monitoring, diagnostic and treating equipment, as well as coverage by trained specialists, are available. By reason of the foregoing, deaths due to heart attacks have been dramatically reduced in such areas of hospitals. However, the incidence of deaths due to heart failure in the hospital ward, semiprivate and private floors has been largely unaffected by reason of the economic and technical factors which limit intensive-care monitoring to critical cases only. Suspected cardiac patients, in general, are put under close observation, but not monitored. Further, there is a lack of confidence in existing monitor alarms due to their complexity and unpredictable operation.

More specifically, virtually all existing heart rate monitors are artifact-sensitive, that is, they respond to conditions other than actual changes in the arterial pulse rate and/or the ECG-QRS waveform, such as, "noise" generated in the electrical circuitry by reason of displacement of the ECG electrodes on the patient, and thus have a high incidence of false alarms which has caused the users to lose confidence in such monitors. In fact, the alarm circuits of existing monitors are frequently turned off and, in some coronary-care units, nurses continually observe the electrocardiograph waveforms to screen out real alarms from artifacts. The existing heart rate monitors are further disadvantageous in that they have many adjustments, contain much superfluous instrumentation, and require trained personnel to interpret their readings.

Accordingly, it is an object of this invention to provide a heart rate monitor which is relatively inexpensive, simple to operate and false-alarm-free, and which requires minimal adjustments for adaptation to a particular patient, whereby to encourage the use of such monitor on all suspected cardiac patients, and on patients recovering from serious operations.

Another object is to provide a heart rate monitor which afford indications to hospital personnel that the monitor is operating properly, whereby the monitor can be relied upon to indicate the onset or occurrence of a dangerous condition.

A further object is to provide a heart rate monitor which gives an alarm, preferably of audio and visual character, either at the bedside or to a central nurse-call system, whenever the patient's heart rate is continuously outside of preset limits or upon the accumulation of a predetermined number of occurrences of a heart rate outside of such limits during a predetermined period.

Still another object is to provide a heart rate monitor which, up the existence of a dangerous condition, gives an alarm indicative of the nature of such condition so as to alert hospital personnel thereto and permit the rapid assembling of equipment that may be required to treat the particular condition being encountered.

Since a major problem in heart rate monitors concerns false alarms due to artifacts, such as those due to the displacements of electrodes or pickups on the patients which results in relatively high-frequency signals to the monitor, the heart rate monitor according to this invention employs two inputs from ECG electrodes and from an arterial pulse pickup, respectively, and provides an alarm only when both inputs correlate to indicate the existence of a dangerous condition. Further, in order to avoid false alarms, the heart rate monitor according to this invention provides a relatively longer delay in the actuation of its alarm when the detected condition may not be too dangerous and is of a character which might be caused by an artifact, for example, as in the case of the detection of a high ECG rate and a high arterial pulse rate, whereas a much shorter delay in actuation of the alarm is afforded when the more dangerous conditions are detected, such as, no arterial pulse and no ECG low arterial pulse rate and low ECG rate or high ECG rate and no arterial pulse, as in the case of fibrillation.

It is a further feature of a heart rate monitor according to this invention to provide the two channels thereof, which receive the ECG and arterial pulse inputs, respectively, with automatic gain control so that the magnitudes of the ECG-QRS pulses and of the arterial pulses, which may vary from patient to patient or in dependence on the type of pickups employed, will not influence the operation of the monitor and the latter can be applied to a wide range of patients with the only adjustments required being those of the allowable high and low limits of the heart rate which may be set by the attending physician. In order to facilitate such minimal adjustments, a preferred embodiment of this invention provides a linear relationship between the movement of rate-limit-setting members, such as rotatable knobs, and the respectively high and low limits of allowable ranges of heart rate established thereby.

The above, and other objects, features and advantages of this invention, will be apparent in the following detailed description of an illustrative embodiment thereof which is to be read in connection with the accompanying drawings, wherein:

FIG. 2 is a block diagram illustrating the elements that may be contained in a component of the monitor of FIG. 1 to convert either the sensed arterial pulse rate or the sensed QRS rate to a corresponding DC voltage;

FIG. 3 is a detailed diagrammatic view of a preferred circuit arrangement for setting each of the high and low limits of the heart rate to be monitored;

FIG. 4 is a detailed diagrammatic view of the circuit elements that may be included in a component of the monitor of FIG. 1 to control the actuation of the alarm thereof.

Figure 1:
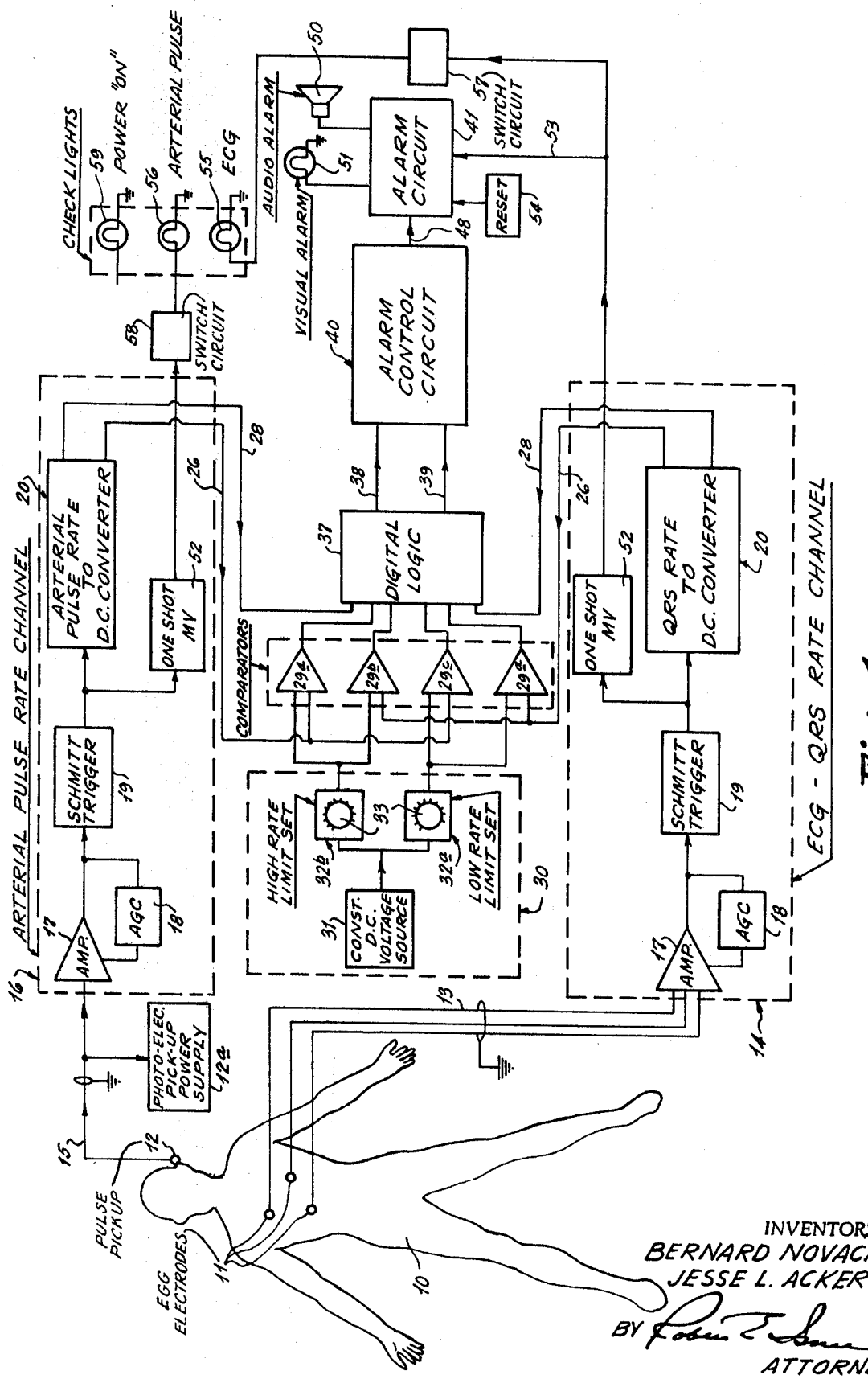
FIG. 1 is a block diagram illustrating the components of a heart rate monitor according to this invention.

Referring to the drawings in detail and initially to FIG. 1 thereof, it will be seen that an apparatus according to this invention for monitoring the heart rate of a patient 10 employs, as its two inputs, electrical signals from suitable transducers, for example, from the usual number of conventional ECG electrodes 11 suitably attached and located on the patient and from an arterial pulse pickup 12. The electrodes 11 may be of any standard configuration, although for long term monitoring it is desirable that low artifact, liquid center electrodes be utilized. The arterial pulse pickup 12 may also be any one of the many standard types presently employed, but for minimum sensitivity to movements of the patient, such pickup 12 is preferably in the form of a photoplethysmograph which is attached to the patient's ear to detect blood flow pulsations in the anterior auricular artery and to convert such pulsations into similar electrical pulses or signals.

Figure 5:
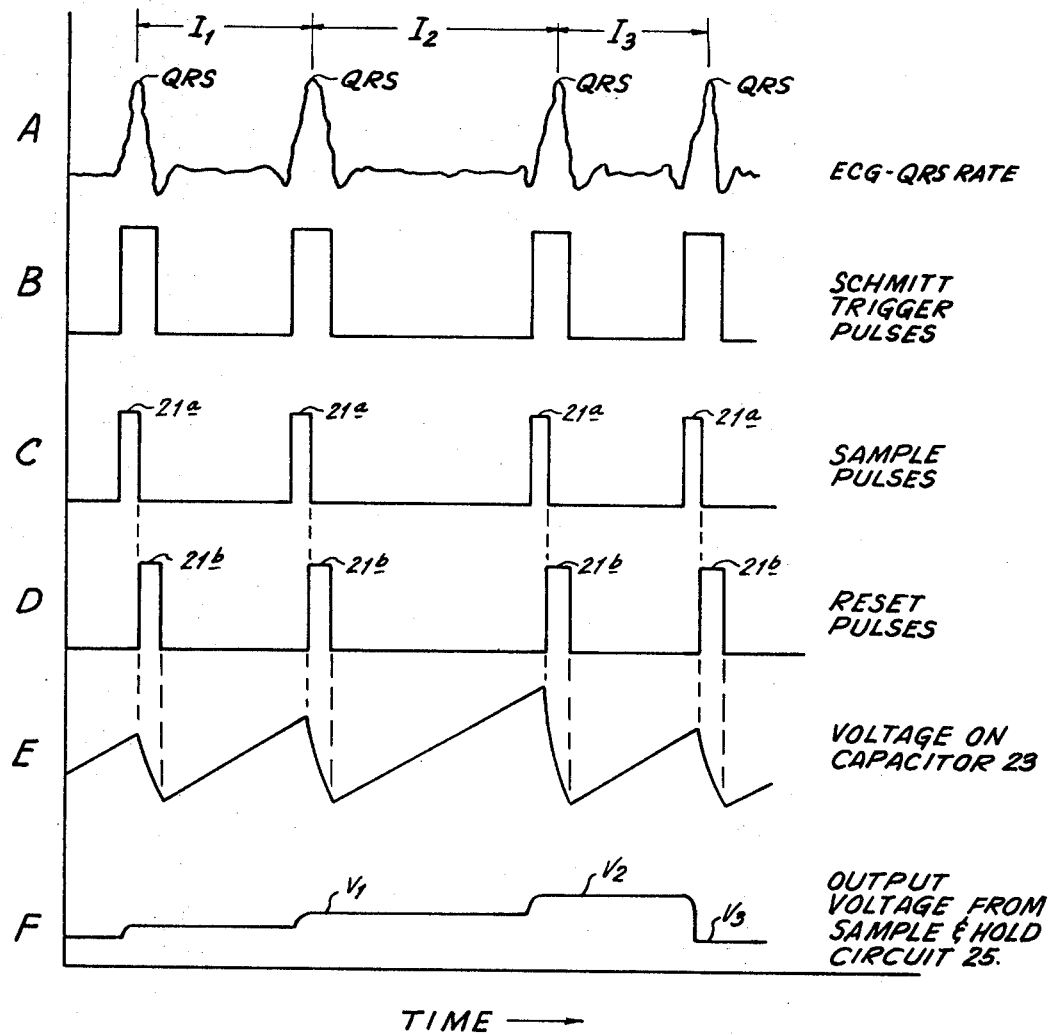
FIG. 5 is a graphic illustration of the time relationships between electrical values existing at various points in one of the channels of the monitor shown on FIG. 1.

The electrical signals from electrodes 11 which include relatively sharp, tall QRS pulses corresponding to ventricular excitation, as indicated at A on FIG. 5, are conducted through a shielded lead 13 to constitute the input to an ECG-QRS rate channel indicated generally at 14, and the signals from pickup 12 which consist of electrical pulses corresponding to the arterial pulse rate are conducted through a shielded lead 15 to an arterial pulse rate channel indicated generally at 16. Preferably, as shown, the power supply 12a for the lamp of pickup 12 is responsive to the magnitude of the pulses from such pickup, so that the average intensity of light received by the photocell of such pickup will be maintained substantially constant irrespective of variations in the patient's skin pigmentation or ear thickness, and also irrespective of wear or changes in the condition of the lamp bulb.

The channels 14 and 16 are similar to each other and serve to standardize both the amplitudes and widths of the electrical pulses contained in the respective inputs and then to convert the intervals between the standardized electrical pulses into corresponding electrical outputs, preferably in the form of DC voltages that are proportional to the intervals between the standardized pulsed and hence inversely proportional to the ECG-QRS rate in the case of channel 14 and to the arterial pulse rate in the case of channel 16.

More specifically, as shown in FIG. 1, each of channels 14 and 16 includes a differential amplifier 17 receiving the input to the respective channel and having a high impedance input, such as, approximately 10 megohms, and good common mode rejection. In order to automatically compensate for variations in the patient and in the electrodes or pickup supplying the respective input, the amplifier 17 of each channel has an automatic gain control 18 incorporated therein which functions to maintain a constant pulse amplitude in the output from amplifier 17. The amplified output of amplifier 17 containing either QRS or arterial pulses of standard magnitude is fed to a Schmitt trigger circuit 19 by which the respective pulses are converted into standard height squared pulses, as indicated at B on FIG. 5. Of course, it will be understood that the intervals between the standard height, squared pulses contained in the output of each Schmitt trigger circuit 19 will vary in accordance with the intervals between the QRS pulses in the input to channel 14 and the intervals between the arterial pulses in the input to channel 16.

The output of each Schmitt trigger circuit 19 is fed to a component 20 in the respective channel by which the intervals between the successive standard height squared pulses are converted into the DC voltages of corresponding magnitude. As shown particularly on FIG. 2, the component 20 in each of each of channels 14 and 16 may include a dual one-shot multivibrator 21, a constant current source 22 for charging a capacitor 23, a reset circuit 24 under the control of dual one-shot multivibrator 21 for periodically discharging capacitor 23, and a sample or track-and-hold circuit 25, also under the control of dual one-shot multivibrator 21, for periodically sampling and then holding the voltage on capacitor 23 so that the voltage at the output 26 of sample-and-hold circuit 25 will, at any time, correspond to the voltage on capacitor 23 when last sampled. As shown, sample-and-hold circuit 25 may simply comprise a gate 25a which is opened by each pulse out of section 21a of dual one-shot multivibrator 21 to apply the voltage then on capacitor 23 to a hold capacitor 25c, and a high impedance follower 25b through which the voltage held by capacitor 25c is applied to output 26.

The above-described elements of each component 20 operate as follows:

When a squared, standardized pulse is received from the respective Schmitt trigger 19 by dual one-shot multivibrator 21 to enable the latter, the first pulse out of the section 21a of the dual one-shot is fed to sample and hold circuit 25 which is thereby turned on for a short period that is merely sufficient for the sampling of the voltage then appearing on capacitor 23. At the termination of the first pulse from section 21a of the dual one-shot, sample-and-hold circuit 25 holds the voltage that it previously sample, as indicated at F on FIG. 5, until the next sampling pulse is received from dual one-shot 21, at which time circuit 25 again samples the voltage then appearing on capacitor 23. The second pulse out of section 21b, which closely follows the end of the first pulse out of section 21a of the dual one-shot, is fed to reset circuit 24 so as to cause the latter to discharge capacitor 23 therethrough and, at the conclusion of the second pulse out of dual one-shot 21, reset 24 is again deactivated so as to permit recharging of capacitor 23 from constant current source 22. Thus, during each interval between successive second pulses out of section 21b of the dual one-shot, as indicated at D on FIG. 5, capacitor 23 is continuously charging, as indicated at E on FIG. 5, whereby to attain a voltage at each sampling period which is linearly proportional to the duration of the preceding charging interval.

Thus, the output 26 from sample-and-hold circuit 25 is a staircase type of waveform, the magnitude of which stays constant between QRS pulses and only changes when there is a change in the interval between successive pulses. For example, if the interval $I_2$ between adjacent QRS pulses is greater than the preceding interval $I_1$ and is followed by an interval $I_3$ which is shorter than the interval $I_1$, as shown at A on FIG. 5, the voltage $V_1$ appearing at output 26 during the interval $I_2$ will correspond to the duration of the preceding interval $I_1$, the voltage $V_2$ appearing at output 26 during interval $I_3$ will be greater than the voltage $V_1$ to represent the increase of interval $I_2$ over interval $I_1$, and the voltage $V_3$ appearing at output 26 during the interval following interval $I_3$ will be less than the voltage $V_1$ to indicate the fact that the interval $I_3$ is shorter than the interval $I_1$, as indicated at F on FIG. 5. It will be apparent from the foregoing that the voltage output of sample-and-hold circuit 25 is proportional to the interval between QRS pulses and inversely proportional to the ECG rate, in the case of channel 14, and is proportional to the interval between arterial pulses and inversely proportional to the arterial pulse rate, in the case of channel 16. It should be noted that the output from circuit 25 will indicate a change of interval or rate within the time of a single interval, and will give an accurate interval measurement within the time for two intervals.

In the event that a situation of no pulse and/or no ECG is suddenly encountered, so that no pulse is emitted by the Schmitt trigger 19 for enabling dual one-shot 21 of component 20, circuit 25 is not triggered to sample the voltage on capacitor 23 and further reset circuit 24 is not actuated to discharge capacitor 23 immediately following the sampling period so that the voltage on capacitor 23 continues to increase. In order to detect a total absence of QRS pulse or of arterial pulse, the component 20 of each of channels 14 and 16 further includes a trigger 27 which responds to an excessive voltage on the related capacitor 23, as when the latter is not periodically discharged by actuation of reset 24, to provide a signal or pulse at its output 28.

Referring again to FIG. 1, it will be seen that the outputs 26 from channels 14 and 16 are respectively fed to comparators 29a and 29b and to comparators 29c and 29d in which the instantaneous values of such outputs are compared with adjustably predetermined voltages set to represent the low and high limits of allowable ranges of the QRS and arterial pulse rates, respectively. The adjustably predetermined voltages to be compared with the voltages of outputs 26 are derived from a component 30 that includes a constant DC voltage source 31 and units 32a and 32b for adjustably setting the low and high limits, respectively, of the range of voltages beyond which deviations of the voltages of outputs 26 are to be detected.

Since the outputs 26 of channels 14 and 16 have voltages thereon that are inversely proportional to the QRS and arterial pulse rates and it is desirable to provide the units 32a and 32b with simple, linear dial settings which correspond to low and high limits of the allowable rates, it is preferred to have units 32a and 32b provide output voltages which vary inversely with respect to the movements of the knobs 33 or other adjusting members thereof by which the respective limits are to be adjustably set or predetermined. As shown on FIG. 3, the foregoing object may be achieved by providing each of units 32a and 32b with an operational amplifier 34 having a constant voltage $E_1$ from source 31 as its input and a feedback loop in which a potentiometer 35 is interposed so that the output voltage $E_2$ of amplifier 34 will be proportional to $E_1/X$, in which X represents the movement of the arm 36 of potentiometer 35. With the described arrangement in each of units 32a and 32b, potentiometer arm 36 can be coupled to the respective knob 33 for movement by the latter, and the desired low or high rate limit setting may be determined by the coaction of an index on such knob with an adjacent, linearly calibrated scale or dial.

As is shown in FIG. 1, the adjustably predetermined output voltage of unit 32a corresponding to the low rate limit setting is supplied to comparators 29a and 29c for comparison therein with the voltages of outputs 26 from channels 14 and 16, respectively. If the voltages of outputs 26 from channels 14 and 16 correspond to QRS and arterial pulse rates lower than the low rate limit for which the output voltage of unit 32a has been adjustably set, then comparators 29a and 29c emit suitable signals which are fed to a digital logic 37. Similarly, the adjusted output voltages of unit 32b is fed to comparators 29b and 29d and the latter emit suitable signals to digital logic 37 in the event that the voltages of outputs 26 from channels 14 and 16 respectively correspond to QRS and arterial pulse rates exceeding the high rate limit for which unit 32b has been set. It is further to be seen that the outputs 28 from triggers 27 in components 20 of channels 14 and 16 are also connected to digital logic 37 so that the latter will receive signals by way of such outputs 28 whenever there is no QRS pulse of no arterial pulse.

Thus, digital logic 37 receives separate signals indicating high pulse rate, high QRS rate, low pulse rate, low QRS rate, no arterial pulse and no QRS pulse, respectively. The digital logic 37 is a NOR logic system employing standard microcircuit digital logic modules, for example, as disclosed in the GE Transistor Handbook, Logic Section, to discriminate between combinations of received signals which are to be accepted as true alarm conditions, and those signals received from any of the comparators from the outputs 28 which are to be rejected as artifacts. More specifically, digital logic 37 provides an output signal only when it receives combinations of signals representing the following conditions:

Condition 1. High arterial pulse rate and high QRS rate.
Condition 2. High QRS rate and no arterial pulse (fibrillation).
Condition 3. Low arterial pulse rate and low QRS rate.
Condition 4. No arterial pulse and no QRS pulse.

As indicated on FIG. 1, the output of digital logic 37 is split into two channels 38 and 39 extending to an alarm control circuit 40, and an output signal is sent through channel 38 whenever digital logic 37 detects the presence of condition 1 above, whereas an output signal is sent through channel 39 whenever digital logic 37 detects the presence of any one of conditions 2, 3 or 4. The purpose of providing two different output channels 38 and 39 for carrying output signals representing different types of sensed conditions to alarm control circuit 40 is to make it possible to provide different delays for the actuation of an alarm 41 upon the reception by the circuit 40 of signals in the channel 38 of signals in the channel 39, respectively. More specifically, circuit 40 provides a relatively large time delay before actuation of alarm 41 when successive signals are received through channel 38 to indicate the existence of condition 1, that is, a high arterial pulse rate and a high QRS rate, as such condition indicates that the patient's heart is still functioning, albeit at an excessively fast rate, and since the voltages at the outputs 26 of both channels 14 and 16 may be falsely indicating high arterial and QRS pulse rates as a result of an artifact which would usually be of a relatively high frequency. Thus, the relatively long time delay provided in the case of signals received through channel 38 gives further insurance against the occurrence of false alarms in response to artifacts. On the other hand, a relatively short time delay is provided for actuation of the alarm circuit in the case of signals received by circuit 40 through channel 39 as such signals indicate the occurrence of conditions 2, 3 or 4 and would be respectively due to fibrillation, shock and a stoppage of all heart function, and thus indicative of dangerous conditions requiring immediate attention and treatment by hospital personnel.

As shown particularly on FIG. 4, the foregoing operations of circuit 40 may be obtained by providing such circuit with a free-running multivibrator or clock 42 generating sharp spikes or pulses, for example, at about a 10 Hz. rate, and by which two gated constant current sources 43 and 44 are turned on and off to emit pulses of current. The sources 43 and 44 are suitably set so that the pulses of current emitted thereby have relatively small and large values, respectively, and such pulses of current are fed through gates 45 and 46 to charge a capacitor 47 whenever gates 45 and 46 are opened or turned on by the reception of signals through channels 38 and 39, respectively. An output 48 of circuit 40 applies the voltage on capacitor 47 to alarm circuit 41 so as to actuate the latter for operating the alarm whenever the voltage on capacity 47 exceeds a predetermined value. Since the pulse of current transmitted through gate 45 from source 43 upon the occurrence of each signal in channel 38 is of a lower value than the pulse of current transmitted through gate 46 from source 44 upon the occurrence of each signal in channel 39, it is apparent that the number of signals through channel 38 required to raise the voltage on capacitor 47 to the value for actuating alarm circuit 41 is larger than the number of signals in channel 39 required for actuation of the alarm circuit. Thus, actuation of the alarm circuit is relatively delayed with respect to signals indicating condition 1 occurrences.

As is further seen on FIG. 4, circuit 40 Electronics includes a countdown divider 49 also receiving the spikes or sharp pulses from clock 42 and being operative to transmit a pulse to a reset circuit 50 at predetermined intervals which can be adjustably set, at the divider 49, for example, within a range extending from 5 seconds to 8 hours. Whenever reset circuit 50 receives a pulse from countdown divider 49, capacitor 47 is discharged through the reset circuit. Countdown divider 49 may, for example, have a circuit arrangement similar to that disclosed at page 94 of the March 18, 1968 issue of Electronics.

It will be apparent that, as signals are received by circuit 40 through channel 38 and/or channel 39, the voltage on capacitor 47 builds up in a staircase fashion. If the voltage on capacitor 47 does not exceed the value at which alarm circuit 41 is to be actuated during the interval for which countdown divider 49 is set, then, at the conclusion of each such interval, capacitor 47 is discharged and the buildup of voltage thereon commences again during the next interval. The foregoing permits the monitor embodying this invention to be employed as a heart attack predictor. For such use, divider 49 can be set for a long interval, such as 8 hours, to cause the alarm to be actuated as a result of the accumulation of voltages on capacitor 47 by reason of a predetermined number of fibrillation episodes recurring during the set period.

When the voltage at output 48 exceeds the predetermined value to actuate alarm circuit 41, the latter locks in to cause operation of an audio alarm 50 and a visual alarm 51. Preferably, such operation of audio and visual alarms 50 and 51 is of a pulsating or intermittent character and is made to occur in synchronism with the QRS pulses in channel 14. In order to effect such intermittent operation of alarms 50 and 51, channel 14 is shown to be provided with a one-shot multivibrator 52 receiving the output from Schmitt trigger 19 in channel 14 and being operative to deliver a pulse to alarm circuit 41, as at 53, whenever a pulse is received from the associated Schmitt trigger 19. Each pulse delivered to alarm circuit 41 by one-shot multivibrator 52 of channel 14 serves to turn off alarm 50 and 51 for a short period. Thus, when the alarm is operated in response to condition 4, that is, in response to a stoppage of all heart function, no pulses are supplied by one-shot multivibrator 52 to alarm circuit 41 so that alarms 50 and 51 are operated continuously. On the other hand, when alarm circuit 41 is actuated in response to any of conditions 1, 2 and 3, alarms 50 and 51 are operated in synchronism with the QRS rate, so that hospital personnel responding to the alarm are immediately apprised of the nature of the condition causing the alarm and can rapidly assemble the equipment and specialists that may be required for treatment of that particular condition. Once alarm circuit 41 has been actuated by the presence of an excessive voltage at output 48 of circuit 40, circuit 41 locks in so that the operation of audio and visual alarms 50 and 51 is maintained either continuously or intermittently, as described above, until a reset 54 is actuated, as by a switch (not shown) on a control panel of the apparatus.

In addition to the audio and visual alarms 50 and 51, the apparatus embodying this invention is preferably provided with check lights 55 and 56 which are intended to blink or be illuminated intermittently in synchronism with the patient's QRS wave and arterial pulse, respectively. In order to achieve such operation of light 55 and 56 the output of one-shot multivibrator 52 in channel 14 may also be supplied to a switch circuit 57 for energizing light 55 and the arterial pulse rate channel 60 may also be provided with a one-shot multivibrator 52 actuated by the pulses from the associated Schmitt trigger 19 and having its output supplied to a switch circuit 58 for energizing the light 56. The switch circuits 57 and 58 are arranged to turnoff lights 55 and 56 only when pulses are received from the respective one-shots 52. The apparatus may further be provided with a light 59 which is suitably connected so as to be energized whenever power is supplied to the heart rate monitor. Thus, proper operation of the heart rate monitor can always be determined merely by glancing at the lights 55, 56 and 58 which may be mounted on a clearly visible panel of the apparatus. During proper operation of the monitor, light 58 is continuously illuminated and lights 55 and 56 blink or are intermittently illuminated in synchronism with the QRS rate and the arterial pulse rate of the patient.

It will be apparent that, in the apparatus as described above, the QRS wave and arterial pulse waveforms received from electrodes 11 and photoplethysmograph 12 are normalized and applied to respective pulse interval to DC converters 20 which sample the intervals at every pulse. The comparators 29a–29 determine whether the DC voltages representing the pulse intervals are within the normal ranges or outside the limits of such ranges, and out-of-limit conditions are screened through digital logic 37 to reject artifact conditions. By reason of the different time delays applied to signals in the output channels 38 and 39 of digital logic 37, there is further rejection of possible artifact conditions so as to avoid false alarms. When a bona fide alarm condition exists, the audio and visual alarms 50 and 51 are made to operate in synchronism with the patient's ECG-QRS wave so as to indicate the nature of the condition causing the alarm.

As previously indicated, the intervals for actuation of reset 50 in alarm control circuit 40 may be suitably extended so that the apparatus can function to accumulate signals representing fibrillation episodes over a long period of time and to operate the alarms when the number of such episodes within the selected period of time exceeds a predetermined value, whereby to predict the occurrence of a heart attack. If desired, the output 48 from alarm control circuit 40 can also be connected to a counter device (not shown) which is responsive to the voltage at output 48 to present a visual count of the number of fibrillation episodes represented by the output voltage.

Since the various types of rate aberrations are separated in the digital logic 37, such occurrences as missed beats can be monitored in 45 therefrom to a suitable external counter for visually indicating the number of the missed beats.

Since the input amplifiers 17 of channels 14 and 16 are provided with automatic gain controls 18 and the AGC voltage, in each case, varies in accordance with changes in the amplitude of the respective input signal, the AGC voltages could be monitored over a long period of time to indicate a gradual decrease in the amplitude of the arterial pulse or of the ECG amplitude so as to provide a warning of an impending occurrence.

Since the apparatus as described above is substantially free of false alarm indication, requires only setting of the units 32a and 32b for establishing the low and high limits of the range of heart rates to be tolerated, which settings are easily effected with respect to linearly calibrated dials or scales, and does not require any diagnostic skill for ascertaining that a dangerous condition is being detected, such apparatus is ideally suited for use throughout hospitals in areas where highly trained personnel may not be continuously available. It will be apparent that the alarms 50 and 51 for indicating the existence of a dangerous condition may be situated in the vicinity of the patient being monitored so as to immediately indicate the location of the patient experiencing such condition. However, it will be apparent that such audio and visual alarms or additional alarms connected in parallel therewith, and/or the check lights 55 and 56 of the monitor may be situated at a central station for supervision of a number of monitors by a single nurse on duty at such station.

Although an illustrative embodiment of this invention, and several modifications thereof, have been described in detail herein with reference to the accompanying drawings, it is to be understood that the invention is not limited to that precise embodiment and the specifically mentioned modifications, and that additional changes and modifications may be effected therein by one skilled in the art without departing from the scope or spirit of the invention, as defined in the appended claims.

What is claimed is:

1. Apparatus for monitoring the heart rate of a patient comprising means including transducer means attachable to the patient to provide first and second electrical outputs characteristic of the rates of QRS and arterial pulses, respectively, alarm means actuable to signal cardiac arrythmias, means to detect deviations of said first and second electrical outputs beyond upper and lower limits of allowable ranges therefor, and means for causing actuation of said alarm means only in response to patient conditions represented by predetermined combinations of detected deviations of said first and second electrical outputs from said allowable ranges.

2. Apparatus as in claim 1, in which said means for causing actuation of the alarm means includes time delay means providing different time delays for said actuation of the alarm means upon occurrences of certain of said predetermined combinations of detected deviations and of others of said predetermined combinations of detected deviations.

3. Apparatus as in claim 1, in which said means for causing actuation of the alarm means includes means to produce respective signals upon occurrences of said predetermined combinations of detected deviations, and alarm-actuating means operable upon the accumulation of predetermined numbers of said signals.

4. Apparatus as in claim 3, in which said predetermined number of signals corresponding to certain of said combinations of detected deviations is different from said predetermined number of signals corresponding to others of said combinations of detected deviations, whereby to provide different time delays for actuation of said alarm means in response to the occurrences of different combinations of detected deviations.

5. Apparatus as in claim 3, further comprising timed means to reset said alarm-actuating means at predetermined intervals so that said alarm means is actuated thereby upon the accumulation of said predetermined numbers of signals within any of said intervals.

6. Apparatus as in claim 5, in which said predetermined number of signals corresponding to certain of said combinations of detected deviations is different from said predetermined number of signals corresponding to others of said combinations of detected deviations, whereby to provide different time delays for actuation of said alarm means in response to the occurrences of different combinations of detected deviations.

7. Apparatus as in claim 1, further comprising means to operate said alarm means in synchronism with said QRS pulses upon said actuation of the alarm means.

8. Apparatus as in claim 1, in which said predetermined combinations of detected deviations represent a first condition in which QRS and arterial pulse rates are both above said upper limits of said allowable range therefor, a second condition in which QRS and arterial pulse rates are both below said lower limits of said allowable ranges therefor, a third condition in which said QRS pulse rate is above said upper limit of said allowable range therefor and there is no arterial pulse, and a fourth condition in which there is not !qrs pulse and no arterial pulse.

9. Apparatus as in claim 8, in which said means for causing actuation of the alarm means includes means to produce first and second signals upon each occurrence of said first condition and upon each occurrence of any of said second, third and fourth conditions, respectively, and alarm-actuating means operable upon the accumulation of a relatively large number of said first signals and a relatively small number of said second signals.

10. Apparatus as in claim 9, further comprising timed means to reset said alarm-actuating means at predetermined intervals so that said alarm means is actuated thereby upon the accumulation of said large number of first signals or said small number of second signals within any of said intervals.

11. Apparatus as in claim 1, in which said means to provide said first and second electrical outputs has separate channels extending from the respective transducer means and each including amplifier means with automatic gain control to provide output pulses of constant amplitude irrespective of the amplitude of the pulses from the respective transducer means, and means to produce a DC voltage of a magnitude that varies in accordance with the lengths of successive intervals between said output pulses of constant magnitude and which constitutes said electrical output from the respective channel.

12. Apparatus as in claim 1, in which said means to provide said first and second electrical outputs has separate channels extending from the respective transducer means and each including means to produce a DC voltage of a magnitude that varies in accordance with the lengths of successive intervals between pulses from the respective transducer means to constitute said electrical output of the respective channel, and said means to detect deviations of said first and second electrical outputs includes means to produce standard DC voltages of magnitudes representing said upper and lower limits of the allowable ranges and comparator circuit means for issuing corresponding signals when the DC voltages of variable magnitude constituting said first and second electrical outputs are outside the ranges of voltages established by said standard DC voltages.

13. Apparatus as in claim 12, in which said means to produce said standard DC voltages include, for each standard voltage, amplifier means having a fixed input voltage and a feedback loop with a potentiometer having a resistance value that is variable by movement of the arm of said potentiometer so that the standard DC voltage at the output of said amplifier means is adjusted inversely with respect to said movement of the arm.

14. Apparatus as in claim 12, in which said means for causing actuation of said alarm means includes digital logic circuit means receiving said signals from said comparator circuit means producing signals for causing actuation of the alarm means only when the received signals correspond to said predetermined combinations of deviations.

15. Apparatus as in claim 14, in which each of said separate channels further includes means to transmit a signal directly to said logic circuit means upon the absence of pulses from the respective transducer means.

16. Apparatus as in claim 1, further comprising signal lights for visually indicating the patient's QRS and arterial pulses, and means operable by the respective transducer means to effect illumination of said signal lights in synchronism with said QRS and arterial pulses.

17. Apparatus as in claim 1, in which said transducer means includes ECG electrodes for producing electrical pulses corresponding to said QRS and a photoplethysmograph pickup for producing electrical pulses corresponding to said arterial pulse, and variable power supply means are provided for said photoplethysmograph pickup to ensure that the output from the latter unaffected by variation of said pickup and of the patient's skin transmissibility.